US011157646B2

(12) United States Patent
Grau

(10) Patent No.: US 11,157,646 B2
(45) Date of Patent: Oct. 26, 2021

(54) SYSTEMS AND METHODS FOR PROCESSING AND HANDLING PRIVACY-SENSITIVE IMAGE DATA

(71) Applicant: Intel Corporation, Santa Clara, CA (US)

(72) Inventor: Oliver Grau, Voelklingen (DE)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 16/143,507

(22) Filed: Sep. 27, 2018

(65) Prior Publication Data

US 2019/0050592 A1 Feb. 14, 2019

(51) Int. Cl.
*G06F 21/62* (2013.01)
*G06N 20/00* (2019.01)
*G06F 9/54* (2006.01)

(52) U.S. Cl.
CPC ........ *G06F 21/6245* (2013.01); *G06F 21/629* (2013.01); *G06N 20/00* (2019.01); *G06F 9/54* (2013.01)

(58) Field of Classification Search
CPC ...... G06F 21/629; G06F 21/6245; G06F 9/54; G06N 20/00

USPC .......................................................... 726/26
See application file for complete search history.

(56) References Cited

U.S. PATENT DOCUMENTS

2015/0035999 A1\* 2/2015 Shehane ............. G06F 21/6209
348/207.1
2016/0246996 A1\* 8/2016 Khoo ................... G11B 27/031
2017/0287036 A1\* 10/2017 Barday .............. G06Q 30/0609

OTHER PUBLICATIONS

Defeating Image Obfuscation with Deep Learning Richard McPherson; Reza Shokri; Vitaly Shmatikov Sep. 6, 2016 (Year: 2016).\*

\* cited by examiner

*Primary Examiner* — Benjamin A Kaplan
(74) *Attorney, Agent, or Firm* — Viering, Jentschura & Partner MBB

(57) ABSTRACT

Methods, systems, and apparatus, including computer programs encoded on a computer storage medium, for handling data including images with privacy-sensitive data. In one aspect, a method may include recognizing privacy-sensitive sub-image(s) in an acquired or captured image. The sub-image(s) can be included in a second image that is encrypted. The acquired image can be changes by obscuring the privacy-sensitive sub-image(s) of the acquired image so as not to reveal any personal identifiable information.

17 Claims, 6 Drawing Sheets

SYSTEMS AND METHODS FOR PROCESSING AND HANDLING PRIVACY-SENSITIVE IMAGE DATA

TECHNICAL FIELD

Various embodiments generally relate to systems and methods for handling and processing data including privacy-sensitive or personally identifiable information.

BACKGROUND

In developed countries like Western Europe, data privacy standards are very high and aim to protect the individual rights. However, many applications or processes that may benefit from the use of private data, such as, autonomous driving, may require negotiation of exceptional licenses with the local authorities.

Currently, machine learning and in particular deep learning methods are outperforming the classic computer vision and pattern recognition techniques based on a fixed operator pipeline. The success and performance of deep learning techniques depend on the availability of training data of citizens by restricting the capture and use of images for commercial purpose. Use cases like the acquisition of training data of pedestrians in urban environments for automated driving or any other application that involves human beings, data privacy is an issue.

Some public facing services like Google Streetview automatically blur or pixelate faces in images to protect the privacy of individuals. Another important class would be car license plates. However, for machine-learning applications, this approach would destroy details that would be needed for most applications that should detect persons, vehicles, or other objects.

SUMMARY

According to one or more exemplary embodiments of the present disclosure, a method for handling privacy-sensitive information may include obtaining, at one or more computing devices, an original image, identifying, by the one or more computing devices, one or more privacy-sensitive areas in the obtained image, creating, by the one or more computing devices, a privacy-sensitive image from the obtained image, the privacy-sensitive image including the one or more identified privacy-sensitive areas of the obtained original image, encrypting, by the one or more computing devices, the privacy-sensitive image, and modifying, by the one or more computing devices, the image by obfuscating the one or more identified privacy-sensitive areas of the obtained original image.

According to one or more exemplary embodiments of the present disclosure, a method, that may be executed by one or more computing devices, may include obtaining a modified image including one or more obfuscated privacy-sensitive areas; obtaining an encrypted privacy-sensitive image associated with the obtained modified image including one or more unobfuscated privacy-sensitive images corresponding to the one or more privacy-sensitive areas of the associated obtained image; decrypting the encrypted privacy-sensitive image; generating a constructed image in a protected memory segment by using the privacy-sensitive image and the modified image, the constructed image is a version of the modified image with the one or more privacy-sensitive areas unobfuscated.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which.

DESCRIPTION

The word "exemplary" is used herein to mean "serving as an example, instance, or illustration." Any embodiment or design described herein as "exemplary" is not necessarily to be construed as preferred or advantageous over other embodiments or designs.

Exemplary embodiments of the present disclosure can be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a microprocessing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD), a flash memory device, a memory card, and the like. By way of illustration, specific details and embodiments in which the invention may be practiced.

Figure 1:
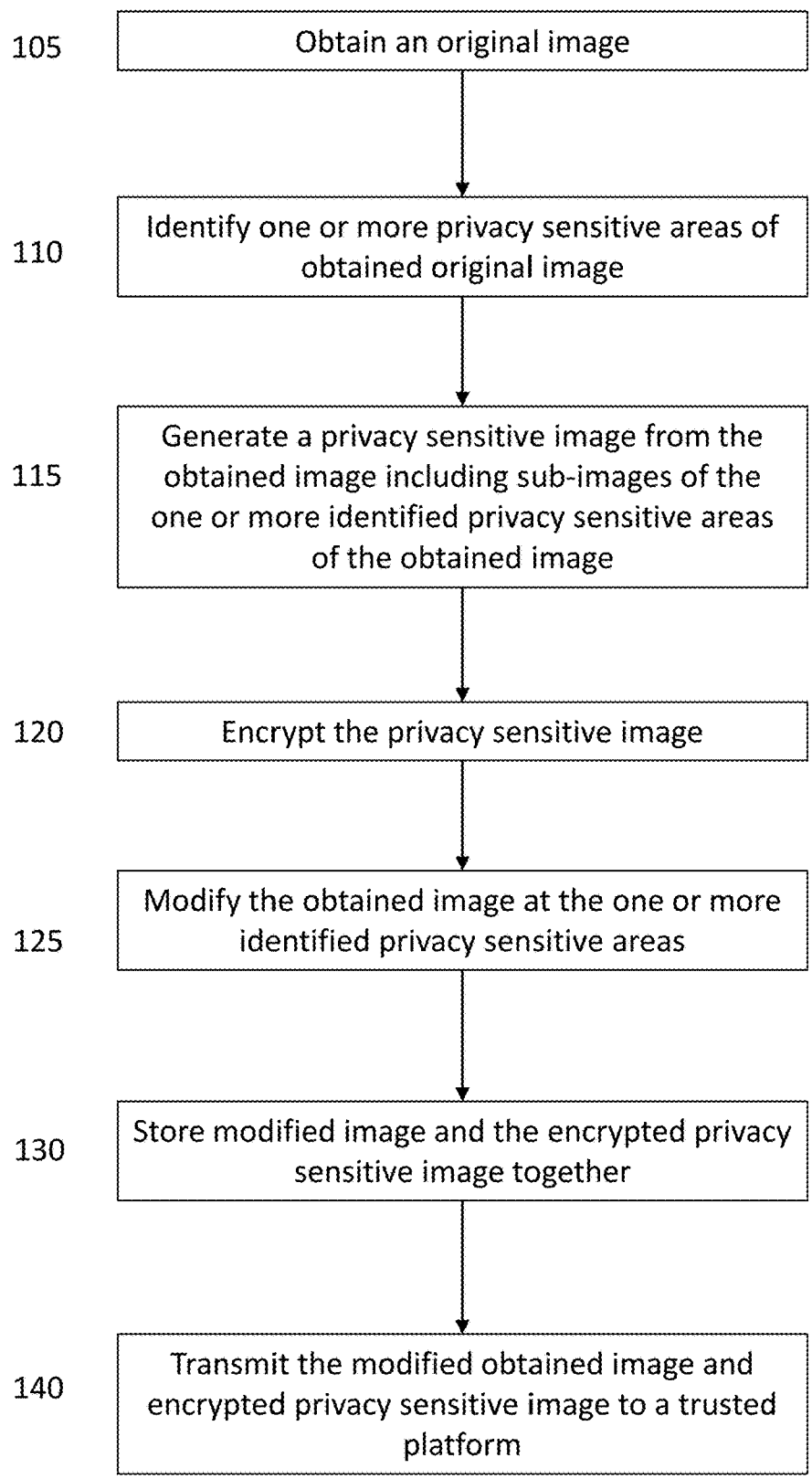
FIG. 1 shows according to at least one exemplary embodiment of the present disclosure, a method for handling and processing images including privacy-sensitive data.

FIG. 1, shows according to an exemplary embodiment, a method for handling and processing images including privacy-sensitive data. One or more computing devices may implement the exemplary method. For example, such a process may be performed by the exemplary system of FIG. 3. For example, one or more computing devices, operatively coupled to one another, may implement such a method.

Figure 3:
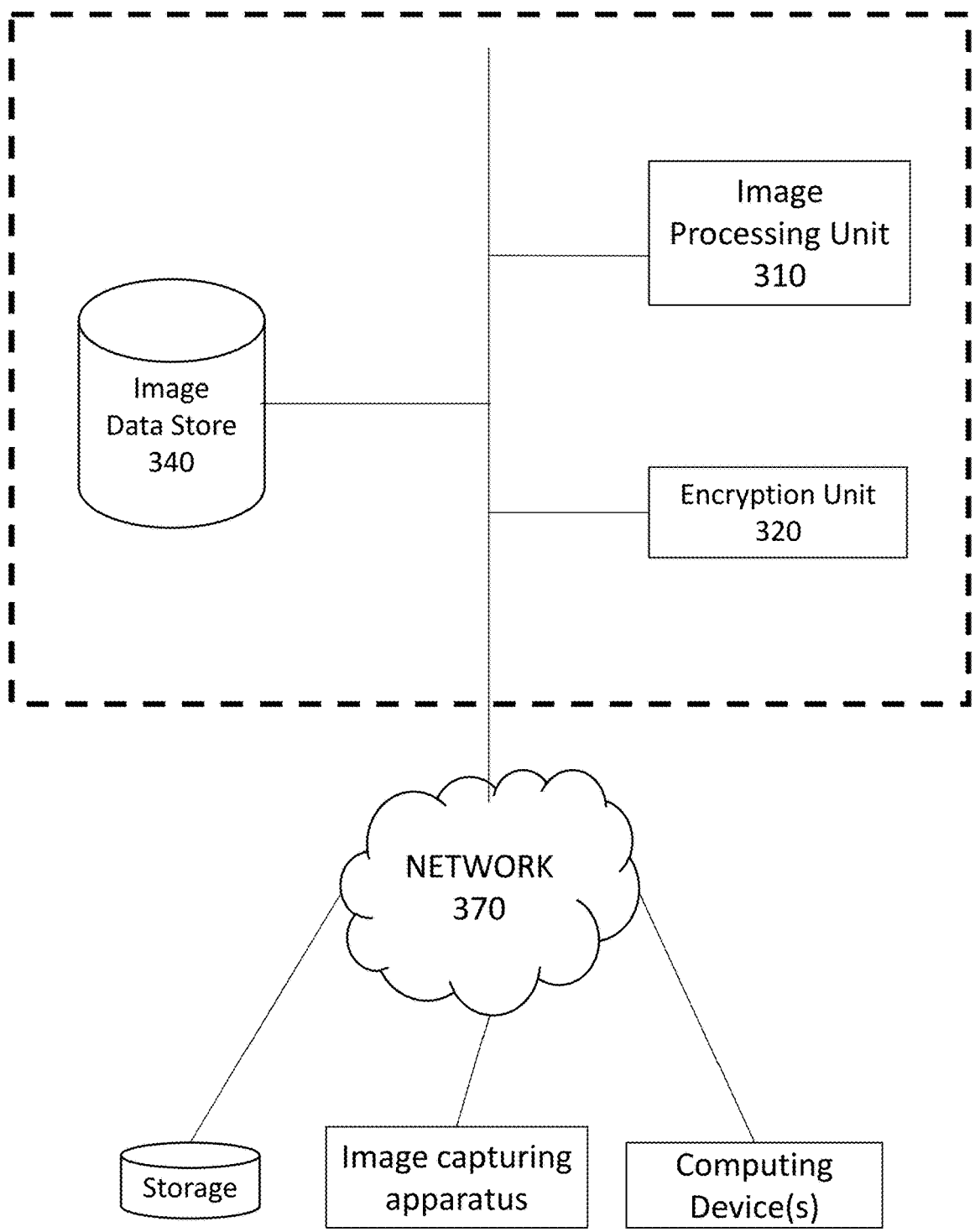
FIG. 3 shows, in accordance with at least one exemplary embodiment of the present disclosure, an exemplary image processing system.

FIG. 3 depicts, in accordance with exemplary embodiments of the present disclosure, an image processing system 300 may include one or more computing devices may be represented as functional processing units. For example, an image processing system may include an image processing unit 310, an encryption unit 320, and storage, such as image data store 340. Such components may be located at a particular site or location and operatively connected to each other. In other embodiments, such components may be distributed remotely and operatively connected through a network connection 370. In any event, the engines may represent particular computation functions to implement various methods and processes described herein.

Referring back to FIG. 1, at 105, an original image may be obtained at one or more computing devices. An image capturing apparatus may capture the image at a public location or location. In one example, the image may have been taken by a camera, e.g., positioned on a vehicle in a city.

For example, in FIG. 3 an image capturing apparatus may be remotely connected to the image processing system 300 and can be configured to communicate the obtained image. In other embodiments, a copy of the image may be stored or copied in a storage medium. Another computer may transmit the image to image processing system 300, or the image may be directly uploaded to the image processing system 300 (e.g., image data store 340) from the storage medium.

Before being obtained, the original image may an image that has not been obfuscated in any manner. That is the original image may be processed to the extent for improving image quality (e.g., noise reduction, rotation, cropping, clarifying), but not for concealing any image sections therein.

After obtaining the image, at 110, one or more privacy-sensitive areas of the image may be identified. That is, the computing devices may apply any suitable algorithms or processes to the obtained the image to detect or identify privacy-sensitive areas or positions of the acquired image. For example, face detection algorithms, various computer vision techniques (e.g., Viola-Jones algorithms, neural networks), machine learning processes/applications, may be utilized to identify privacy-sensitive areas. The privacy-sensitive areas or regions of the obtained may be sub-images including human faces, license plates, markings, specific signs or heraldic signs and symbols or any other private or personal identifying information, like individual clothes, buildings, and consumer goods or art. Data indicating the location(s) of the privacy-sensitive areas of the obtained image may be saved or stored for future use. Referring to FIG. 3, the image processing engine 310 may process the obtained original image to recognize and identify one or more privacy-sensitive areas or sections or the original image.

At step 115, a privacy-sensitive image is generated from the original image including the one or more identified privacy-sensitive areas of the acquired image. The sub-images corresponding to the recognized or identified the privacy-sensitive area(s) of the acquired or received image can be copied or inserted into a new image or image file by one or more computing devices. This privacy-sensitive image may include data indicating the respective previous positions of sub-images in the obtained original image. Referring to FIG. 3, the image processing engine 310 may generate the privacy-sensitive image.

At 120 of FIG. 1, the privacy-sensitive image is encrypted. For example, the aforementioned one or more computing devices may encrypt the privacy-sensitive image using any suitable technique, process, or algorithm. In some embodiments, an encryption key is used to encrypt the privacy-sensitive image. Such an encryption key may be obtained from a trusted source, e.g., a trusted platform, for example. Referring to FIG. 3, the encryption engine may encrypt the privacy-sensitive image.

At 130, the obtained original image is modified by obfuscating the one or more identified privacy-sensitive areas thereof. That is, one or more computers may obfuscate or digitally obscure the sub-image(s), or the area(s) of the obtained original image that contain the privacy-sensitive sub-images. The obfuscation may be done to render the sub-images (and thus the overall modified) as having no personally identifiable information. As a result, the new modified image, with the sub-images obfuscated, will not show personally identifiable information. In the context of FIG. 3, the image processing engine 310 can obfuscate one or more areas of an image that have been identified as including personally identified information (e.g., privacy-sensitive images).

The obfuscation can be done in any suitable manner or using any proper technique. For example, a mask may be applied to each of the sub-images of the original image. The result may be that the sub-images modified to include a single color, be pixelated, and/or be blurred. That is the obfuscation may irreversibly change the sub-image and thus the resulting overall image.

Referring, again to FIG. 1, at 130, the modified image and the encrypted privacy-sensitive image may be stored together. That is, the modified image and the privacy-sensitive image can be saved together, as a container data structure. That is, in exemplary embodiments of the present disclosure, the modified image and privacy-sensitive image can be stored together as single or multiple files.

Additionally, other data or information may be saved with the modified image and the privacy-sensitive image. For example, data or information, indicating the previous positions in the original image of sub-images, which are now included in the privacy-sensitive image, can also be added together with the privacy-sensitive image and the modified image. Referring again to FIG. 3, the image processing engine 310, or any other suitable component may save the privacy-sensitive image, the modified image, and other appropriate data to the image data store 340.

In FIG. 1, at 140, the encrypted privacy-sensitive image and the corresponding original image may be communicated, e.g., electronically transmitted, to another resource, for example, a trusted platform.

Further, in other exemplary embodiments, the modified images, e.g., the images with the obfuscated privacy-sensitive areas may be transmitted by themselves to other destinations for commercial or private use with less restriction. Further, other commercial users or other users may receive both the modified image data file and the encrypted privacy-sensitive image which, as explained in embodiments to follow, cannot be fully accessed unless they have acquired a valid key.

In other exemplary embodiments, the encrypted privacy image may be implanted with or multiple versions of each privacy sensitive sub-image. Different encryption levels may be used with varying degrees of quality (e.g., using sub-sampling) of the privacy-sensitive levels. That a user would have access to different quality levels depending on the authorized key, they have acquired.

Figure 2:
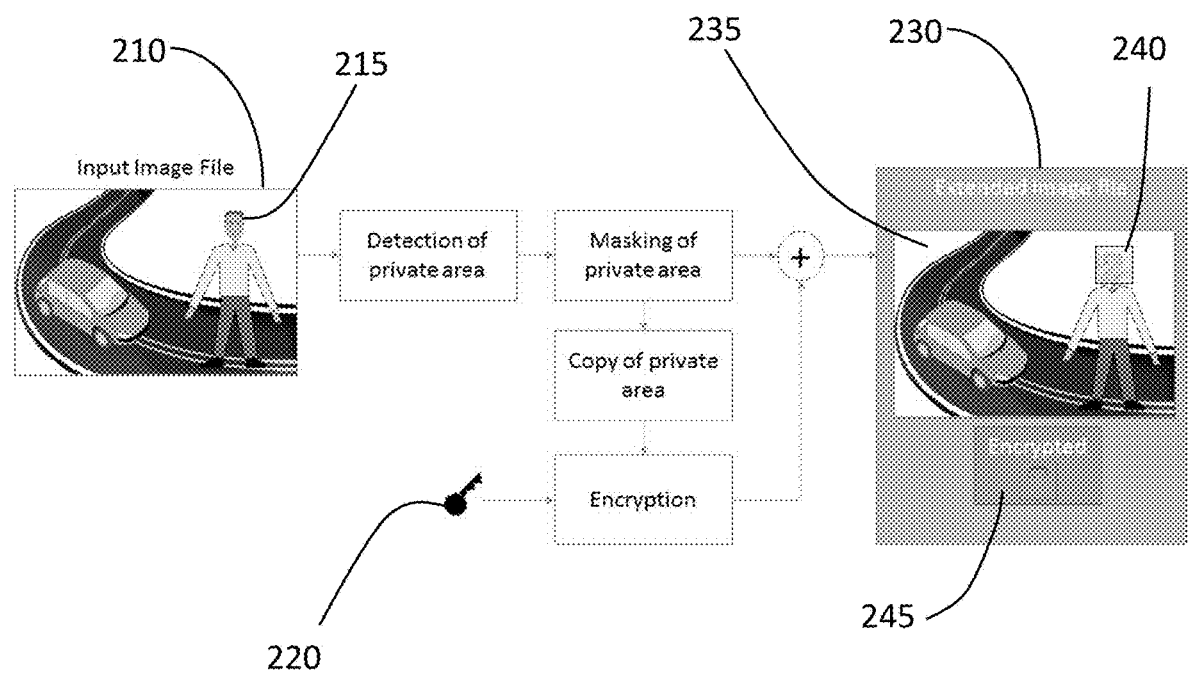
FIG. 2, shows a visual representation an exemplary implementation of the process of FIG. 1 according to at least one exemplary embodiment of the present disclosure.

FIG. 2, shows a visual representation of one exemplary implementation of the process of FIG. 1. An original image or input image file 210 can include an original image file received by one or more computing devices. As shown, the input image file 210 may be a captured image including a privacy-sensitive section 215. This privacy-sensitive section or sub-image 215 in FIG. 2 is a human face. As shown in FIG. 2 this input image file 210 is electronically analyzed and processed. Namely, as explained with respect to FIG. 1, private areas or privacy-sensitive sections 215 of the input image file 210 are detected. As FIG. 2 shows, by the detection, the privacy-sensitive sections 215 are copied into a new file, which is encrypted using an encryption key 220. Further, the privacy-sensitive areas 215 are masked.

Finally, FIG. 2 shows an extended image file 230 is created or generated that includes the modified original file 235 combined with the encrypted privacy-sensitive section 245 of the input image file 210. As described in exemplary embodiments, the modified original file 235 contains at least on obfuscated section 240 that corresponds to a privacy-sensitive section 215 of the original input image file 210. In this example, the obfuscated section 240 is a human face that has been masked, so that is no longer identifiable due to masking applied to it. The extended image file 230 may be forwarded in any suitable manner to a further system or platform for additional use in accordance with embodiments described herein.

Figure 4:
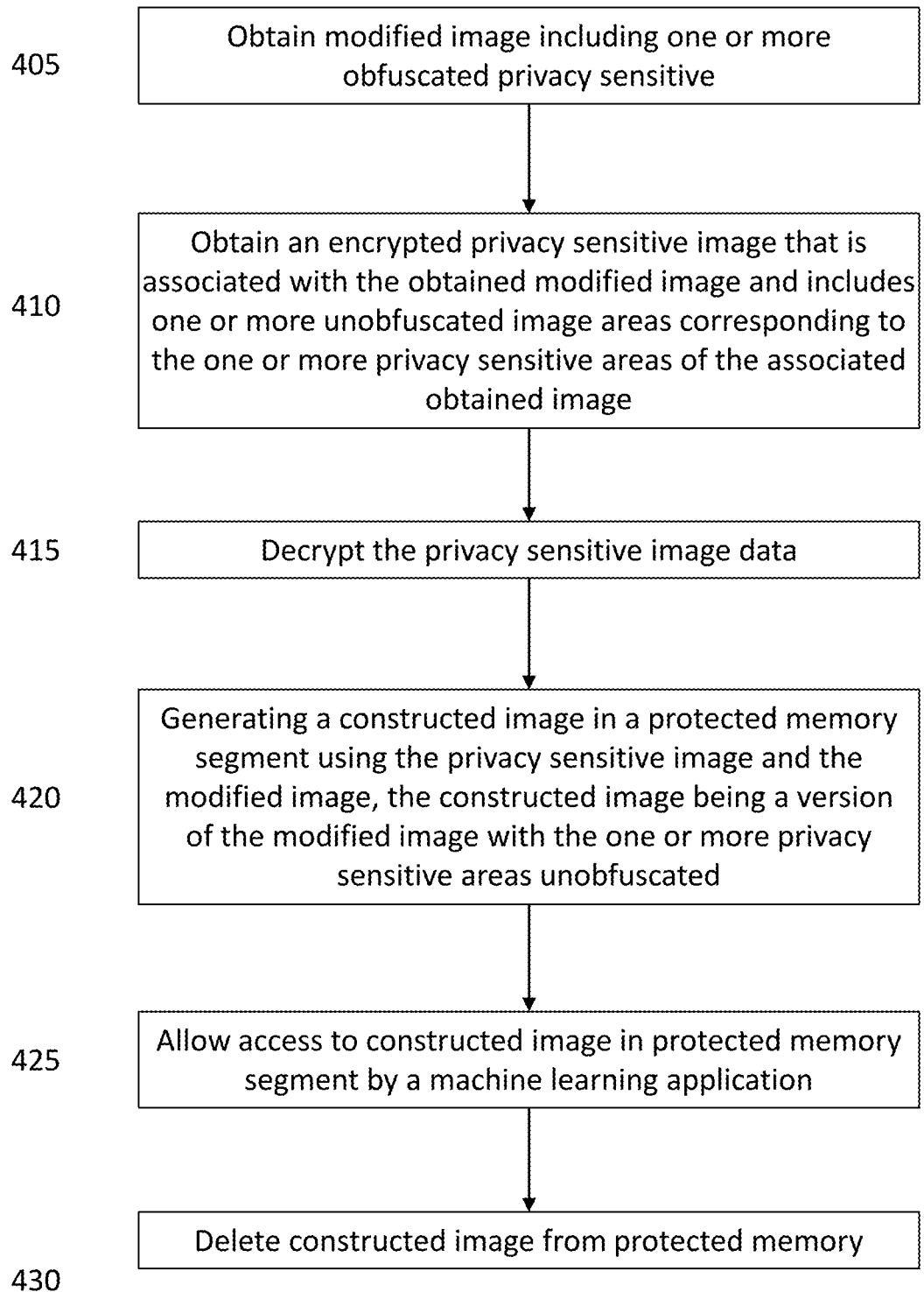
FIG. 4, shows according to at least one exemplary embodiment of the present disclosure, another method for handling and processing images including privacy-sensitive data.

FIG. 4, shows according to an exemplary embodiment, a further method for handling and processing images including privacy-sensitive data for additional application. Again, one or more computing devices may implement the exemplary method. For example, such a process may be performed by the exemplary system or trusted platform 600 of FIG. 6. For example, one or more computing devices of the trusted platform 600 may be operatively coupled to one another and configured to implement such a method. The trusted platform 600 of FIG. 6 may include an image processing unit 610, a decryption unit 620, a machine learning unit 630, and an image data store 640. Such components may be located together at a particular site or distributed at different locations. Further, these components can be operatively connected to each other through a network connection 650. The units 610-630 may be computing devices including processors that carry out various processes and methods described herein.

Further, in other exemplary embodiments, an image capturing apparatus (e.g., sensor) may be configured to not only capture an image including at least one or more privacy-sensitive sub-images, but also be configured to create or generate a modified image with the privacy-sensitive sub-images obfuscated and to create an encrypted version of the privacy-sensitive sub-images. In other words, the image capturing apparatus may include functionality to execute all or some steps 105-140 of FIG. 1. In other words, the image capturing device(s) or apparatus(es) may be considered as a part of a trusted chain.

First in FIG. 4, at 405, a modified image is obtained that includes one or more obfuscated privacy-sensitive areas. Further, at 410 of FIG. 4, an encrypted privacy-sensitive image is obtained that is associated with the obtained modified image and includes one or more unobfuscated image areas corresponding to the one or more privacy-sensitive areas of the associated modified image. For example, one or more computing devices may obtain a modified image file including the privacy-sensitive areas that are pixelated, blurred, etc., and may further obtain the associated privacy-sensitive image including the obfuscates images of the privacy-sensitive areas of the modified image.

Figure 6:
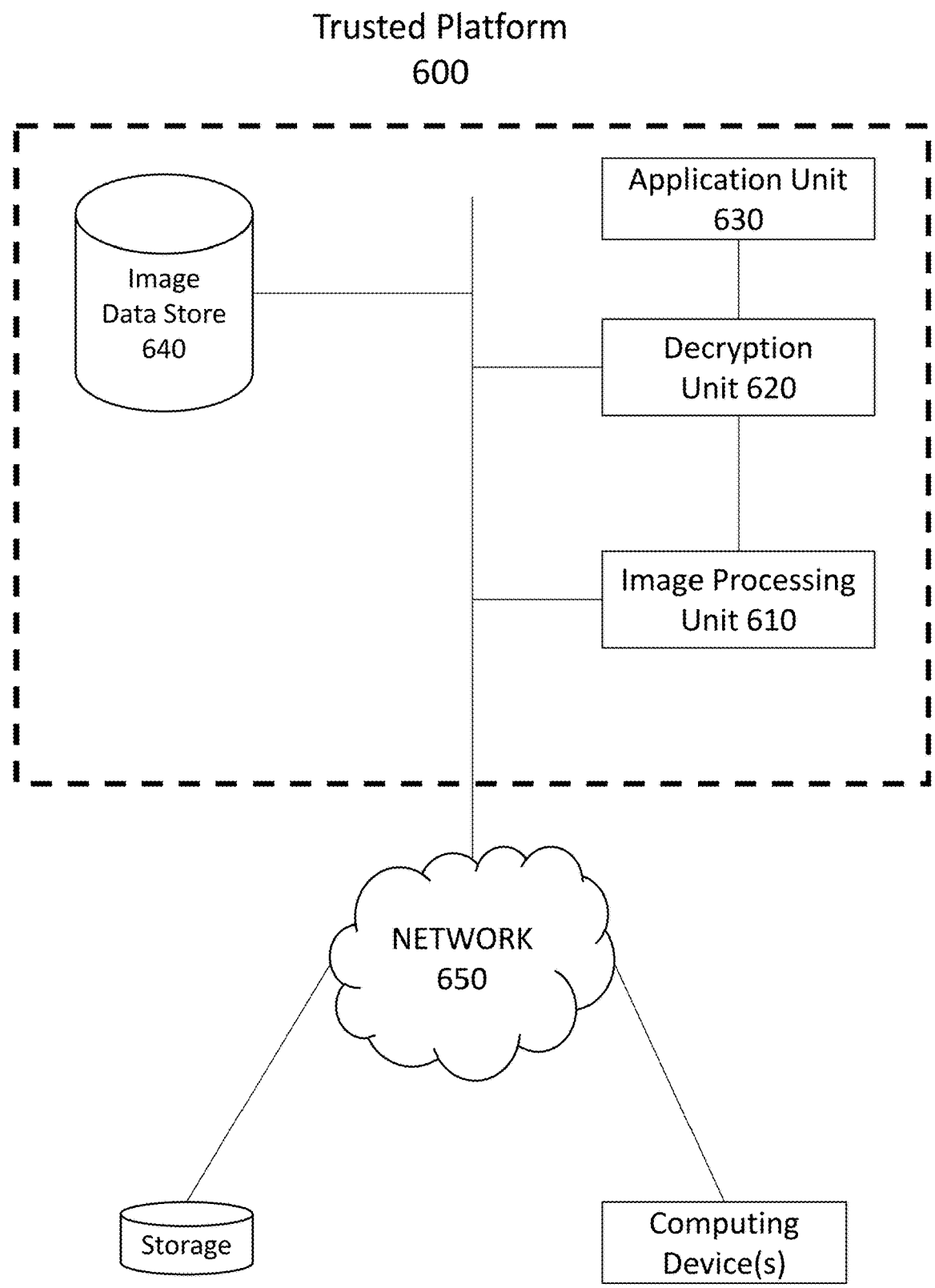
FIG. 6 shows, in accordance with at least one exemplary embodiment of the present disclosure, an exemplary platform for handling and processing images.

In the context of FIG. 6, for example, the image processing unit 610 may obtain the modified image and the privacy-sensitive image. Both images may be obtained directly or indirectly through a network 650 connection or obtained from the database, image data store 640, that is connected to the image processing unit 610.

In some exemplary embodiments, the modified image and the privacy-sensitive image may be obtained separately. In other examples, the modified image and the privacy-sensitive image can be acquired together, for example, if they are part of a same file or container data structure. Also, in obtaining the privacy-sensitive image or the modified image, further data may be received or acquired that indicates the positions of the privacy-sensitive images in a previous version of the modified image.

Further, at 415, the privacy-sensitive image is decrypted. The privacy-sensitive image can be decoded or decrypted using any appropriate technique or manner. In the example of FIG. 6, the decryption unit 620 may apply the suitable method (e.g., PGP) to decrypt the privacy-sensitive image. The technique or process applied to decrypt the privacy-sensitive image depends on the technique or process previously used to encrypt privacy sensitive image. In general, for encryption/decryption, any technology may be used, including a public-key or multi-key scheme.

After decrypting the privacy-sensitive image, at 420 in FIG. 4, a constructed image in a protected memory segment using the privacy-sensitive image and the modified image is generated, with the constructed image being a version of the modified image with the one or more privacy sensitive areas now unobfuscated. In other words, the previous or original version of the modified image can be reconstructed by using the modified image and the decrypted privacy-sensitive image. Again, any appropriate method or processing technique may be employed to generate or create the image. Further, in step 415, the privacy-sensitive image may also be decrypted in a protected memory segment.

Also importantly, the created constructed image is stored in a protected memory location or segment. A protected memory location may have restrictions on how the memory location is accessed as compared to an unprotected memory location. For example, a protected memory location may be accessible by an operating system or a kernel space module executed by a processing device but may be otherwise inaccessible by an application that runs in user space. This protection helps ensure that the constructed image including the privacy-sensitive image areas is not saved or copied out.

In exemplary embodiments, the OS of the computer system including the protected memory segment storing privacy-sensitive image may restrict the constructed image from being accessed or passed to one or more particular application. In one example, a machine learning application or program may be given access to or receive the constructed image. The OS may allow the machine learning application may access or obtain the constructed image without copying, transmitting or revealing the privacy-constructed image.

That is, a machine learning algorithm may run on a trusted platform that includes the constructed image in protected memory. Also, the machine learning algorithm may execute in a contained way.

In an example, an API implemented in a trusted platform may be used to pass over input data needed for the image (re)construction including, for example, the modified image, the decrypted privacy-sensitive image, the locations of privacy-sensitive areas, the decryption key. An algorithm underneath the API reconstructs the image and uses it (e.g., for ML training). However, the copy of the reconstructed image is not stored and is not accessible from the outside and is hence 'contained.'

In short, a trusted platform must implement the temporal memory for the reconstructed image including the privacy sensitive areas in a protected memory segment of the operating system and does not allow access to programs of the user domain. In exemplary embodiments, an application executed on the trusted platform, such as machine learning, needs to get access to the protected copy and needs to run in protected memory mode on the trusted platform. The protected memory mode ensures the application does not copy or transmit the constructed image. Accordingly, an application such as a machine learning application uses the privacy-sensitive image temporarily, for example, as training data. In other words, the constructed image is kept temporally in a protected memory segment of the operating system and must not make this accessible to programs of the user domain. Moreover, the constructed image remains in the protected memory segment with access thereto restricted.

Referring back to FIG. 4, at 430 the constructed image is deleted from the protected memory segment. The constructed image may be removed or deleted after the application has ended or after the application has finished using the constructed image. Further, the unencrypted data-sensitive image may also be erased from memory or any storage. In the trusted platform 600 of FIG. 6, the image processing unit 610 and/or the decryption unit, may delete the constructed image and/or the decrypted privacy-sensitive image.

Figure 5:
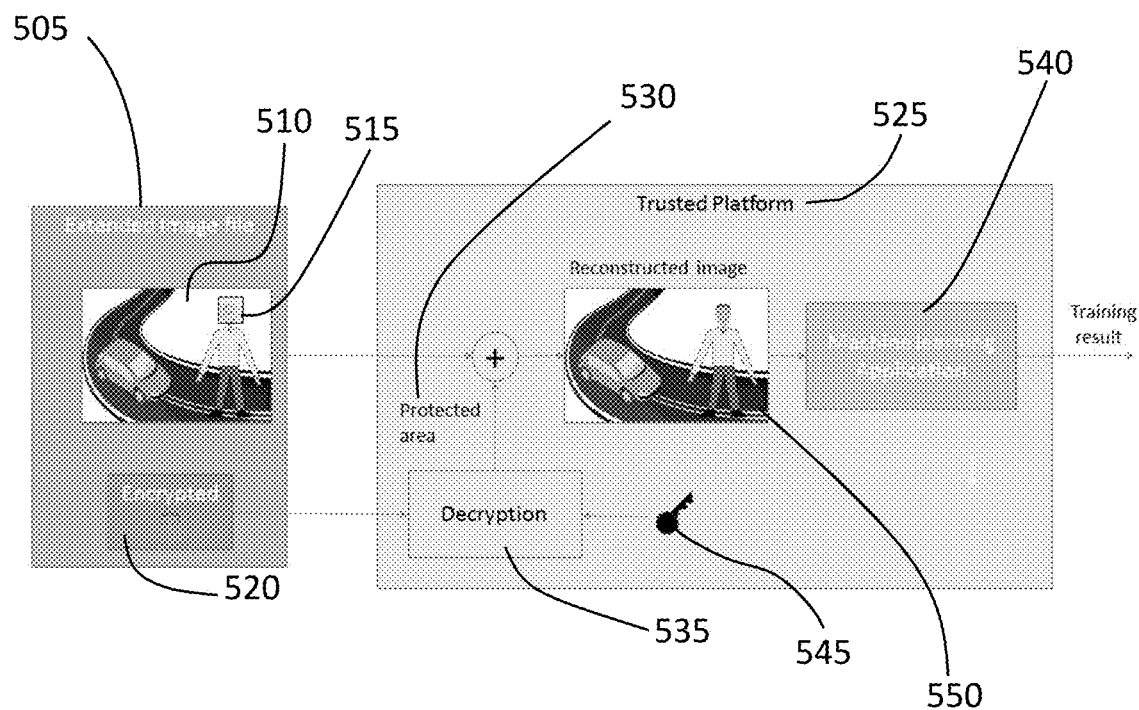
FIG. 5, shows a visual representation an exemplary implementation of the process of FIG. 4 according to at least one exemplary embodiment of the present disclosure.

FIG. 5, shows a visual representation of one exemplary implementation of the process of FIG. 4. An extended image file 505 may include a modified image file 510 in which at least one section includes an obfuscated privacy-sensitive image. That is personally identifiable sub-images, (e.g., sub-image 515) are obscured.

Also, the extended image file 505 includes an encrypted privacy-image file 520. In other words, the privacy-image file 520 contains at least unobfuscated version of the privacy-sensitive areas or sub-images of the modified image file but encrypted. The extended image file 505 may be represented in one file or a data structure in a plurality of files.

The trusted platform 525 receives the extended image file as shown in FIG. 5. The privacy image file 520 is decrypted by a decryption unit 535 using any suitable means. In some exemplary embodiments, the trusted platform, if authorized, receives a valid decrypting key 545 from an authoritative source. That is only authorized platforms may be configured to decrypt the privacy image file 520.

As shown, the decrypted sub-image 510 is added appropriately to the modified image file 510 to form a constructed image 550. The constructed image 550 can be a complete or partial reconstruction of an earlier version of the modified image file 510. That is, in some embodiments, the constructed image may not be a full reconstruction of a previous version of the modified image 510 but may be an approximation.

FIG. 5 shows the obfuscated sub-image 515 (including an identifiable human face) of the modified image file 510 being replaced with the decrypted version. At least the composed or constructed image 550 may be restrictively and temporarily stored in a protected memory segment 530. An authorized application, such a machine learning application 540 may access and use the constructed image 550. The machine learning application may be configured to run in a protected memory mode to maintain the security of the constructed image 550. The protected memory segment that 530 may not be accessible by an outside or a foreign computing device or processor—e.g., a computing device or processor of which the protected memory segment does not belong.

In general, system, devices, and methods are described in exemplary embodiments that encodes images in a privacy protecting way and only allows trusted applications, such as, authorized machine learning software, to read out the full details of images of persons or other sensitive data. However, any trusted application would be configured or limited to reveal or output any or all of the privacy-sensitive image. For example, the authorized machine learning software or application may only output a trained network that does not allow the reconstruction of the privacy-sensitive information.

The following examples pertain to further exemplary implementations.

A first example of the exemplary embodiments of the present disclosure, including a method for handling privacy-sensitive data includes obtaining, at one or more computing devices, an original image, identifying, by the one or more computing devices, one or more privacy-sensitive areas in the obtained image, creating, by the one or more computing devices, a privacy-sensitive image from the obtained image, the privacy-sensitive image including the one or more identified privacy-sensitive areas of the obtained original image, encrypting, by the one or more computing devices, the privacy-sensitive image, modifying, by the one or more computing devices, the image by obfuscating the one or more identified privacy-sensitive areas of the obtained original image.

A second example, the method of the first example further including storing, by the one or more computing devices, the modified image together with the encrypted privacy-sensitive copy.

A third example, the method of the first or second examples wherein the modified image and the encrypted privacy-sensitive copy of the first or second example are stored together in a container structure.

A fourth example, the method of any of the first through third examples further including storing, by the one or more computing devices, privacy-sensitive location data with the modified image and the privacy-sensitive copy, the privacy-sensitive location data indicating locations of the one or more identified privacy-sensitive areas of the obtained image.

A fifth example, the method of any of the first through fourth examples further including transmitting the modified image and the encrypted privacy-sensitive copy to a trusted platform.

A sixth example, wherein in the method of any of the first through fifth examples, the privacy-sensitive areas of the obtained image include one or more facial images and/or can include one or more license plate images.

A seventh example, the method of any of the first through sixth examples, further including identifying the one or more privacy-sensitive areas in the obtained image includes applying a computer vision algorithm to the obtained image.

An eighth example, the method of any of the first through seventh examples, further including obfuscating the obtained image includes applying a mask to the one or more identified privacy-sensitive areas of the obtained image.

A ninth example, the method of the eighth example includes applying a mask includes pixelating or blurring the obtained image at the one or more identified privacy-sensitive areas of the obtained image.

A tenth example in accordance with of the exemplary embodiments of the present disclosure, including a privacy-sensitive data handling system including at least one image capturing apparatus configured to at least one image including one or more privacy-sensitive areas; one or more computing devices configured to obtain the at least one image from the image capturing apparatus, configured to create a privacy-sensitive image from the at least one obtained image, the privacy-sensitive image including the one or more identified privacy-sensitive areas of the obtained original image, configured to encrypt the privacy-sensitive image, and configured to modify the image by obfuscating the one or more identified privacy-sensitive areas of the obtained original image.

An eleventh example, wherein in the tenth example, the one or more computing devices of the privacy-sensitive data handling system are configured to store the modified image together with the encrypted privacy-sensitive copy.

A twelfth example, wherein in the tenth or eleventh examples, the one or more computing devices store the modified image and the encrypted privacy-sensitive copy together in a container structure.

A thirteenth example, wherein in the privacy-sensitive data handling system of any of the tenth through twelfth examples, the one or more computing devices are configured to store the privacy-sensitive location data with the modified image and the privacy-sensitive copy, with the privacy-sensitive location data indicating locations of the one or more identified privacy-sensitive areas of the obtained image.

A fourteenth example, wherein in the privacy-sensitive data handling system of any of the tenth through thirteenth examples, the one or more computing devices are further configured to transmit the modified image and the encrypted privacy-sensitive copy to a trusted platform.

A fifteenth example, wherein in the privacy-sensitive data handling system of any of the tenth through fourteenth examples, the privacy-sensitive areas of the obtained image include one or more facial images and/or can include one or more license plate images.

A sixteenth example in accordance with of the exemplary embodiments of the present disclosure including a method executed by one or more computing devices, wherein the method includes: obtaining a modified image including one or more obfuscated privacy-sensitive areas; obtaining an encrypted privacy-sensitive image associated with the obtained modified image including one or more unobfuscated privacy-sensitive images corresponding to the one or more privacy-sensitive areas of the associated obtained image; and decrypting the encrypted privacy-sensitive image; and generating a constructed image in a protected memory segment by using the privacy-sensitive image and the modified image, the constructed image being a version of the modified image with the one or more privacy-sensitive areas unobfuscated.

A seventeenth example, wherein in the method of the sixteenth example, the constructed image includes or is a copy of a previous version of the modified image data.

An eighteenth example, the method of the sixteenth or seventeenth examples, further including allowing access to the constructed image in the protected memory segment by an application, wherein the application accesses the constructed image while operating in a protected memory mode and removing access to the constructed image after the machine learning application has finished using with the constructed image. Additionally, the method of the third example can further include deleting the constructed image from the protected memory and deleting the decrypted privacy-sensitive image.

A nineteenth example, in the method of any of the sixteenth through eighteenth examples, the application is a machine learning application with the machine learning application accesses the constructed image through an API.

A twentieth example, in the method of any of the sixteenth through nineteenth examples, the protected memory segment may not be accessible by a computing device.

A twenty-first example in accordance with the exemplary embodiments of the present disclosure having one or more computing devices including one or more processors and a non-transitory computer-readable storage medium including instructions that, when executed by the one or more processors, cause the one or more processors to: obtain an image; identify one or more privacy-sensitive areas in the obtained image; create a privacy-sensitive image from the obtained image, the privacy-sensitive image comprising the one or more identified privacy-sensitive areas of the obtained image; encrypt the privacy-sensitive image; modify the image by obfuscating the one or more identified privacy-sensitive areas of the obtained image; and store the modified image and the encrypted privacy-sensitive copy together.

A twenty-second example, wherein in the twenty-first example, the one or more processors are caused to store the modified image and the encrypted privacy-sensitive copy together.

A twenty-third example, wherein in the twenty-first or twenty-second examples, the modified image, and the encrypted privacy-sensitive copy are stored together in a container structure.

A twenty-fourth example, wherein in any of the twenty-first through twenty-third examples, the one or more processors are further caused to store privacy-sensitive location data with the modified image and the privacy-sensitive copy, the privacy-sensitive location data indicating locations of the one or more identified privacy-sensitive areas of the obtained image.

A twenty-fifth example, wherein in any of the twenty-first through twenty-fourth examples, the one or more processors are further caused to transmit the modified image and the encrypted privacy-sensitive copy to a trusted platform.

A twenty-sixth example, wherein in any of the twenty-first through twenty-fifth examples, the privacy-sensitive areas of the obtained image include one or more facial images.

A twenty-seventh example, wherein in any of the twenty-first through twenty-sixth examples, the privacy-sensitive areas of the obtained image include one or more license plate images.

A twenty-eighth example, wherein in any of the twenty-first through twenty-sixth examples, identifying the one or more privacy-sensitive areas in the obtained image includes applying a computer vision algorithm to the obtained image.

A twenty-ninth example, wherein in any of the twenty-first through twenty-eight examples, obfuscating the obtained image includes applying a mask to the one or more identified privacy-sensitive areas of the obtained image.

A thirtieth example, wherein in the twenty-ninth example, applying a mask includes pixelating or blurring the obtained image at the one or more identified privacy-sensitive areas of the obtained image.

A thirty-first example in accordance with the exemplary embodiments of the present disclosure having one or more computing devices including one or more processors and a non-transitory computer-readable storage medium including instructions that, when executed by the one or more processors, cause the one or more processors to: obtain a modified image comprising one or more privacy-sensitive areas, the one or more privacy-sensitive areas being obfuscated; obtain an encrypted privacy-sensitive image that is associated with the obtained modified image, the privacy-sensitive image comprising one or more unobfuscated image areas corresponding to the one or more privacy-sensitive areas of the associated obtained image; decrypt the privacy-sensitive image; generate a constructed image in a protected memory segment using the privacy-sensitive image and the modified image, the constructed image being a version of the modified image with the one or more privacy-sensitive areas unobfuscated.

A thirty-second example, wherein in the method of thirty-first example, the constructed image is a copy of a previous version of the modified image data.

A thirty-third example, wherein in any of the thirty-first through thirty-second examples, the one or more processors are further caused to allow access to the constructed image in the protected memory segment by an application, wherein the application accesses the constructed image while operating in a protected memory mode; and remove access to the constructed image after the machine learning application has finished using with the constructed image.

A thirty-fourth example, wherein in any of the thirty-first through thirty-third examples, the one or more processors are further caused to delete the constructed image from the protected memory; and delete the decrypted privacy-sensitive image.

A thirty-fifth example, wherein in any of the thirty-first through thirty-fourth examples, the application is a machine learning application, and the machine learning application accesses the constructed image through an API.

A thirty-sixth example, wherein in any of the thirty-first through thirty-fifth examples, the protected memory segment is not accessible by an outside computing device.

A thirty-seventh example one or more computing devices include one or more processors and a non-transitory computer-readable storage medium, and include instructions that, when executed by the one or more processors, may cause the one or more processors to: obtain a modified image including one or more privacy-sensitive areas, the one or more privacy-sensitive areas being obfuscated; obtain an encrypted privacy-sensitive image that is associated with the obtained modified image, the privacy-sensitive image including one or more unobfuscated image areas corresponding to the one or more privacy-sensitive areas of the associated obtained image; decrypt the privacy-sensitive image; generate a constructed image in a protected memory segment using the privacy-sensitive image and the modified image, the constructed image being a version of the modified image with the one or more privacy-sensitive areas unobfuscated.

A thirty-eighth example, wherein in the thirty-seventh example, the one or more processors further caused to allow access to the constructed image in the protected memory segment by a machine learning application and removing access to the constructed image after the machine learning application has finished using with the constructed image.

A thirty-ninth example in accordance with of the exemplary embodiments of the present disclosure having a trusted platform including an image store configured to store a modified image including one or more privacy-sensitive areas, the one or more privacy-sensitive areas being obfuscated and store an encrypted privacy-sensitive image that is associated with the obtained modified image, the privacy-sensitive image including one or more unobfuscated image areas corresponding to the one or more privacy-sensitive areas of the associated obtained image; an image processing unit and a decryption unit, the image processing unit and a decryption unit, comprising one or more processors configured to: decrypt an obtained privacy-sensitive image and generate a constructed image in a protected memory segment using the decrypted privacy-sensitive image and the modified image associated with the privacy-sensitive image, wherein the constructed image is a version of the modified image with the one or more privacy-sensitive areas unobfuscated.

A fortieth example wherein in the thirty-ninth example, the constructed image includes a copy of a previous version of the modified image data.

A forty-first example, wherein in the thirty-ninth or fortieth examples, the image processing unit and a decryption unit are further configured to allow access to the constructed image in the protected memory segment by an application, wherein the application accesses the constructed image while operating in a protected memory mode; and remove access to the constructed image after the machine learning application has finished using with the constructed image.

A forty-second example, wherein in any of the thirty-ninth through forty-first examples, the image processing unit and a decryption unit are further configured to delete the constructed image from the protected memory and to delete the decrypted privacy-sensitive image.

A forty-third example, wherein in any of the thirty-ninth through forty-second examples, the application is a machine learning application, and the machine learning application accesses the constructed image through an API.

A forty-fourth example, wherein in any of the thirty-ninth through forty-third examples, the protected memory segment is not accessible by an outside computing device.

It should be noted that one or more of the features of any of the examples above may be combined with any one of the other examples.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes which come within the meaning and range of equivalency of the claims are therefore intended to be embraced.

What is claimed is:

1. A method comprising:
   obtaining, at one or more computing devices, an original image;
   identifying, by the one or more computing devices, one or more privacy-sensitive areas in the obtained image;
   creating, by the one or more computing devices, a privacy-sensitive image from the obtained image, the privacy-sensitive image comprising the one or more identified privacy-sensitive areas of the obtained original image;
   encrypting, by the one or more computing devices, the privacy-sensitive image;
   modifying, by the one or more computing devices, the image by obfuscating the one or more identified privacy-sensitive areas of the obtained original image;
   storing, by the one or more computing devices, the modified image and the encrypted privacy-sensitive copy together; and
   transmitting the stored together modified image and the encrypted privacy-sensitive copy to a trusted platform.

2. The method of claim 1, wherein the modified image and the encrypted privacy-sensitive copy are stored together in a container structure.

3. The method of claim 1, further comprising, storing, by the one or more computing devices, privacy-sensitive location data with the modified image and the privacy-sensitive copy, the privacy-sensitive location data indicating locations of the one or more identified privacy-sensitive areas of the obtained image.

4. The method of claim 1, wherein the privacy-sensitive areas of the obtained image comprise one or more facial images.

5. The method of claim 1, wherein the privacy-sensitive areas of the obtained image comprise one or more license plate images.

6. The method of claim 1, wherein identifying the one or more privacy-sensitive areas in the obtained image comprises applying a computer vision algorithm to the obtained image.

7. The method of claim 1, wherein obfuscating the obtained image comprises applying a mask to the one or more identified privacy-sensitive areas of the obtained image.

8. The method of claim 7, wherein applying a mask comprises pixelating or blurring the obtained image at the one or more identified privacy-sensitive areas of the obtained image.

9. A method for handling privacy-sensitive data and executed by one or more computing devices, the method comprising:
   obtaining a modified image comprising one or more obfuscated privacy-sensitive areas;
   obtaining an encrypted privacy-sensitive image associated with the obtained modified image comprising one or more unobfuscated privacy-sensitive images corresponding to the one or more privacy-sensitive areas of the associated obtained image;
   decrypting the encrypted privacy-sensitive image;
   generating a constructed image in a protected memory segment by using the privacy-sensitive image and the modified image, the constructed image being a version of the modified image with the one or more privacy-sensitive areas unobfuscated,
   wherein the modified image and the encrypted privacy-sensitive image are part of a same file or container data structure so that the modified image and the encrypted privacy-sensitive image are obtained together.

10. The method of claim 9, wherein the constructed image comprises a copy of a previous version of the modified image data.

11. The method of claim 9, further comprising: allowing access to the constructed image in the protected memory segment by an application, wherein the application accesses the constructed image while operating in a protected memory mode; and removing access to the constructed image after the application has finished using with the constructed image.

12. The method of claim 11, further comprising: deleting the constructed image from the protected memory; and deleting the decrypted privacy-sensitive image.

13. The method of claim 11, wherein the application is a machine learning application, and the machine learning application accesses the constructed image through an API.

14. The method of claim 9, wherein the protected memory segment is not accessible by a computing device.

15. One or more computing devices comprising one or more processors and a non-transitory computer-readable storage medium, including instructions that, when executed by the one or more processors, cause the one or more processors to:
   obtain an image;
   identify one or more privacy-sensitive areas in the obtained image; create a privacy-sensitive image from the obtained image, the privacy-sensitive image comprising the one or more identified privacy-sensitive areas of the obtained image;
   encrypt the privacy-sensitive image; modify the image by obfuscating the one or more identified privacy-sensitive areas of the obtained image; and
   store the modified image and the encrypted privacy-sensitive copy together; and
   transmit the stored together modified image and the encrypted privacy-sensitive copy to a trusted platform.

16. One or more computing devices comprising one or more processors and a non-transitory computer-readable storage medium, including instructions that, when executed by the one or more processors, cause the one or more processors to:
   obtain a modified image comprising one or more privacy-sensitive areas, the one or more privacy-sensitive areas being obfuscated;
   obtain an encrypted privacy-sensitive image that is associated with the obtained modified image, the privacy-sensitive image comprising one or more unobfuscated image areas corresponding to the one or more privacy-sensitive areas of the associated obtained image;
   decrypt the privacy-sensitive image;
   generate a constructed image in a protected memory segment using the privacy-sensitive image and the modified image, the constructed image being a version of the modified image with the one or more privacy-sensitive areas unobfuscated,
   wherein the modified image and the encrypted privacy-sensitive image are part of a same file or container data structure so that the one or more processors obtain the modified image and the encrypted privacy-sensitive image together.

17. The one or more computing devices of claim 16, wherein the one or more processors are further caused to: allow access to the constructed image in the protected memory segment by a machine learning application; and removing access to the constructed image after the machine learning application has finished using with the constructed image.

\* \* \* \* \*